(12) United States Patent
Madineni et al.

(10) Patent No.: US 11,316,663 B2
(45) Date of Patent: Apr. 26, 2022

(54) ONE-TIME PASSWORD WITH UNPREDICTABLE MOVING FACTOR

(71) Applicant: International Business Machines Corporation, Armonk, NY (US)

(72) Inventors: Narayana Aditya Madineni, Southport (AU); Leigh Stuart McLean, Nerang (AU); Michael Wallace Gray, Guanaba (AU); James Evans, Lutwyche (AU)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 16/257,453

(22) Filed: Jan. 25, 2019

(65) Prior Publication Data

US 2020/0244441 A1 Jul. 30, 2020

(51) Int. Cl.
*H04L 9/06* (2006.01)
*H04L 9/32* (2006.01)
*H04L 9/00* (2022.01)

(52) U.S. Cl.
CPC .......... *H04L 9/0643* (2013.01); *H04L 9/006* (2013.01); *H04L 9/0637* (2013.01); *H04L 9/3228* (2013.01); *H04L 9/3247* (2013.01); *H04L 2209/38* (2013.01)

(58) Field of Classification Search
CPC ............................. H04L 9/0643; H04L 9/006
USPC ........................................................ 713/168
See application file for complete search history.

(56) References Cited

U.S. PATENT DOCUMENTS

| 8,302,167 | B2 | 10/2012 | Mennes et al. |
| 9,002,750 | B1 | 4/2015 | Chu et al. |
| 9,648,015 | B1 | 5/2017 | Avetisov et al. |
| 10,867,057 | B1* | 12/2020 | Knas ................... G06F 21/6209 |
| 2016/0342977 | A1* | 11/2016 | Lam ................... G06Q 20/0658 |
| 2017/0272251 | A1* | 9/2017 | Osheter ................. H04L 63/062 |
| 2017/0330181 | A1 | 11/2017 | Ortiz |
| 2020/0007316 | A1* | 1/2020 | Krishnamacharya ....................... H04L 63/0815 |

FOREIGN PATENT DOCUMENTS

WO 2017066002 A1 4/2017

OTHER PUBLICATIONS

Haller et al., "A One-Time Password System", Network Working Group, Request for Comments: 2289, Feb. 1998, 26 pages, https://tools.ietf.org/html/rfc2289.
M'Raihi et al., "HOTP: An HMAC-Based One-Time Password Algorithm", Network Working Group, Request for Comments: 4226, Dec. 2005, 37 pages, https://tools.ietf.org/html/rfc4226.

(Continued)

*Primary Examiner* — Anthony D Brown
(74) *Attorney, Agent, or Firm* — Stosch Sabo (57) ABSTRACT

Techniques for authentication using a blockchain hash value as a moving factor. The techniques include retrieving, by an authenticating device and from a blockchain, a current hash value of the blockchain, where the authenticating device and an authenticator server share a secret key value and each have access to the blockchain. The techniques further including generating, by the authenticating device, a secure token based on the secret key value and the current hash value. The techniques further including transmitting the secure token to the authenticator server and receiving an indication of authentication from the authenticator server.

19 Claims, 8 Drawing Sheets

(56) References Cited

OTHER PUBLICATIONS

M'Raihi et al., "TOTP: Time-Based One-Time Password Algorithm", Internet Engineering Task Force, Request for Comments: 6238, May 2011, 16 pages,https://tools.ietf.org/html/rfc6238.
Subpratatsavee et al., "Transaction Authentication Using HMAC-Based One-Time Password and QR Code", Computer Science and Its Applications,Lecture Notes in Electrical Engineering 330, 2015, pp. 93-98.
Park et al., "A TOTP-Based Two Factor Authentication Scheme for Hyperledger Fabric Blockchain", 2018 Tenth International Conference on Ubiquitous and Future Networks (ICUFN), Jul. 3-6, 2018, pp. 817-819.
Mell et al., "The NIST Definition of Cloud Computing", Recommendations of the National Institute of Standards and Technology, Sep. 2011, 7 pages.
McLean et al., "Blockchain Based Authentication", U.S. Appl. No. 16/257,126, filed Jan. 25, 2019.

\* cited by examiner

| 502<br>BLOCK 0 | 504<br>REGISTRATION | 506<br>DETAILS | 508<br>GENESIS BLOCK |
| --- | --- | --- | --- |
| 510<br>BLOCK 1 | 512<br>TRANSACTION<br>DETAILS | 514<br>TRANSACTION<br>DATA | 516<br>BLOCK-0 HASH |
| 518<br>BLOCK 2 | 520<br>TRANSACTION<br>DETAILS | 522<br>TRANSACTION<br>DATA | 524<br>BLOCK-1 HASH |

ONE-TIME PASSWORD WITH
UNPREDICTABLE MOVING FACTOR

BACKGROUND

The present disclosure relates to data security, and, more specifically, to securely generating one-time authentication credentials.

One-time passwords (OTPs) are single-use passwords generated at or near the time they are needed to perform authentication. OTPs overcome security deficiencies associated with static passwords (e.g., replay attacks) by obsolescing a previously used OTP after a single authentication and generating a new OTP for each new authentication.

SUMMARY

Aspects of the present disclosure are directed toward a computer-implemented method comprising retrieving, by an authenticating device and from a blockchain, a current hash value of the blockchain. According to the method, the authenticating device and an authenticator server each have access to the blockchain, and the authenticating device and the authenticator server share a secret key value. The method can further comprise generating, by the authenticating device, a secure token based on the secret key value and the current hash value, where the current hash value is used as a moving factor. The method can further comprise transmitting the secure token to the authenticator server. The method can further comprise receiving an indication of authentication from the authenticator server.

Further embodiments of the present disclosure are directed toward a computer-implemented method comprising receiving, by an authenticator server and from an authenticating device, a secure token, where the authenticating device and the authenticator server share a secret key value, and where the authenticating device and the authenticator server each have access to a blockchain. The method can further comprise generating, by the authenticator server, a verification token based on the secret key value and a current hash value of the blockchain, where the current hash value is used as a moving factor. The method can further comprise determining, by the authenticator server, that the verification token matches the secure token received from the authenticating device. The method can further comprise authenticating the authenticating device in response to determining that the verification token matches the secure token.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward data security, and, more specifically, to securely generating one-time authentication credentials. While not limited to such applications, embodiments of the present disclosure may be better understood in light of the aforementioned context.

Authentication using static information (e.g., password-based, cryptographic key-based, etc.) are susceptible to eavesdropping and/or replay attacks. As a result, single-use keys and/or one-time passwords (OTPs) have been developed to improve security. OTP strategies commonly require a token generation algorithm using a static symmetric key (e.g., a shared secret known to both an authenticating device and an authenticator server) and a moving factor. The moving factor can be, for example, an increasing counter value or an integer representing a number of time steps between an initial counter time and a current time. However, moving factors based on counter values, times, etc. are predictable. Thus, OTPs having moving factors based on counter times remain susceptible to attack.

Aspects of the present disclosure are directed toward an authentication technique exhibiting improved security using a current blockchain hash value as a moving factor. Blockchain hash values are unpredictable (e.g., sequential blockchain hash values have no readily discernible relationship with each other such as the incremental relationship exhibited by counters and time-based moving factors). Thus, an OTP generated with a current blockchain hash value as a moving factor exhibits improved security over OTPs with counter-based moving factors.

Furthermore, limiting access to the blockchain provides an additional layer of security (e.g., multi-factor authentication) to the improved authentication technique previously discussed (e.g., using a current blockchain hash value as a moving factor). For example, access to a blockchain can be controlled by numerous factors including, but not limited to, a password, a user name, a personal identification number, a phone number, an email address, a geolocation, and/or a time interval. Thus, in some embodiments, in order to generate a secure token using a current hash value of the blockchain as a moving factor, an authenticating device must satisfy one or more access parameters in order to access the blockchain to retrieve the current hash value. For example, two access parameters may need to be satisfied including being within a specified area (e.g., a company building) and within a specified time (e.g., between 7:00 AM-7:00 PM) in order to access the blockchain. Once access is granted, the authenticating device can retrieve the current hash value and generate the secure token using the current hash value as the moving factor. Thus, using a blockchain provides the additional benefit of multi-factor authentication in addition to the improved security resulting from an unpredictable moving factor as discussed above.

Finally, in accordance with embodiments of the present disclosure, authentications can be stored in the blockchain in order to achieve two purposes. First, by storing an authentication for a first authentication in the blockchain, the present disclosure automatically renders the previously generated secure token obsolete after use (i.e., because updating the blockchain transactions with the first authentication details can update the current hash value of the blockchain, thereby changing the moving factor used to generate the secure token). Second, storing authentications in the blockchain creates a tamper-proof, immutable, and auditable record of authentications. An accurate record of authentications improves security by improving traceability of authentications.

The aforementioned advantages are example advantages, and embodiments of the present disclosure exist that can contain all, some, or none of the aforementioned advantages while remaining within the spirit and scope of the present disclosure.

Figure 1:
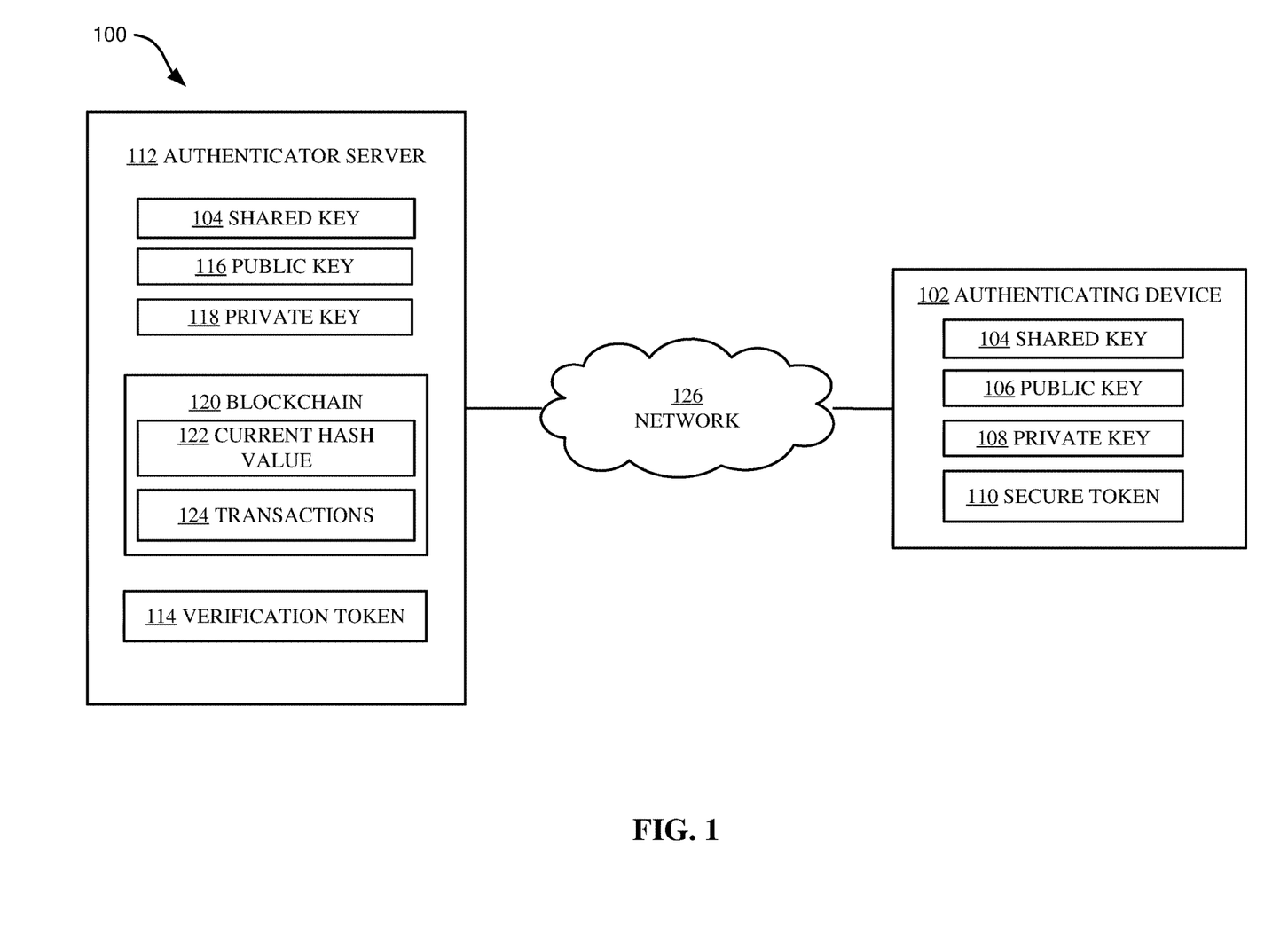
FIG. 1 illustrates a block diagram of an example authentication environment, in accordance with embodiments of the present disclosure.

Referring now to the figures, FIG. 1 illustrates an example authentication environment 100, in accordance with embodiments of the present disclosure. Authentication environment 100 includes an authenticating device 102 communicatively coupled to an authenticator server 112 via a wired or wireless network 126. Network 126 can include physical networks (e.g., Ethernet-based networks), wireless networks (e.g., wireless local area networks (WLAN), wireless wide area networks (WWAN), wireless personal area networks (WPAN), and/or other wireless networks), cellular networks, near-field communication (NFC) networks, internet area networks (IANs), and/or other networks capable of communicatively coupling multiple computer systems together.

Authenticating device 102 can be any device capable of seeking authentication and can include, but is not limited to, smartphones, desktops, laptops, tablets, security devices (e.g., security cards, biochips, etc.), and other devices. Authenticating device 102 can include a shared key 104 and an asymmetric key pair including a public key 106 and a private key 108. Authenticating device 102 can generate secure token 110 for authentication purposes.

Shared key 104 can be, for example, an alphanumeric code that is privately shared with authenticator server 112 and used to generate secure token 110. Shared key 104 can be securely stored (e.g., encrypted or otherwise protected) wherever it resides on authenticating device 102 and authenticator server 112. In some embodiments, shared key 104 is generated at the authenticating device 102, and the authenticating device 102 encrypts the shared key 104 using the public key 116 of the authenticator server 112 before sending the encrypted shared key 104 to the authenticator server 112. The authenticator server 112 can then decrypt the shared key 104 using its private key 118 and securely stores the decrypted shared key 104 on the authenticator server 112. The opposite can also occur (e.g., shared key 104 is generated by authenticator server 112, encrypted according public key 106 of authenticating device 102, and sent to authenticating device 102 via network 126 so that authenticating device 102 can decrypt the encrypted shared key 104 using its private key 108). Other methods, techniques, and strategies can be employed for generating shared key 104.

Each of the authenticating device 102 and the authenticator server 112 can include an asymmetric key pair (e.g., public key 106 and private key 108 of authenticating device 102 and public key 116 and private key 118 of authenticator server 112). The asymmetric key pair of the authenticating device 102 can be used to digitally sign secure token 110 using the private key 108 of the authenticating device 102 such that authenticator server 112 can validate the authenticity of secure token 110 using public key 106 of authenticating device 102. In some embodiments, the public key 106 of authenticating device 102 is stored in blockchain 120.

The asymmetric key pair of authenticator server 112 can be used to validate changes to blockchain 120, such as recording transactions 124. Asymmetric key pairs of authenticating device 102 and authenticator server 112 can be generated using Rivest-Shamir-Adleman (RSA) techniques, or other techniques suitable to generating an asymmetric key pair, now known or later developed.

Authenticating device 102 also includes secure token 110. Secure token 110 can be generated by authenticating device 102 as an OTP or other single-use authentication credential. Secure token 110 can be generated using a shared key 104 and a current hash value 122 of blockchain 120, where the current hash value 122 is used as a moving factor in the algorithm generating the secure token 110.

Secure token 110 can be generated in various ways. In some embodiments, key derivation function(s) (KDF) are used to take the shared key 104 known to the authenticating device 102 and the authenticator server 112 and the current hash value 122 of the blockchain 120 as input to generate the secure token 110.

In some embodiments, secure token 110 is generated using a keyed-hash message authentication code (HMAC) based OTP (HOTP) using, for example, HMAC-SHA-1(K, H) where K is the shared key 104, and where H is the current hash value 122 of the blockchain 120, and where SHA-1 refers to the hashing mechanism (e.g., Secure Hash Algorithm 1).

As will be appreciated by one skilled in the art, other hashing mechanisms, now known or later developed, fall within the spirit and scope of the present disclosure including, but not limited to, secure hash algorithms (e.g., SHA-2, SHA-3, etc.), message digest cryptographic algorithms (e.g., MD4, MD5, MD6, etc.), Research and Development in Advanced Communications Technologies in Europe (RACE) Integrity Primitives Evaluation Message Digest (RIPEMD) cryptographic algorithms, Whirlpool cryptographic algorithms, Blake cryptographic algorithms (e.g., Blake, Blake2, Blake-224, Blake-256, Blake-384, Blake-512, Blake2b, Blake2s, Blake2bp, and/or Blake2sp), Streebog cryptographic algorithms, and/or other cryptographic algorithms.

As will be appreciated by one skilled in the art, generating secure token 110 can include any number of modification steps (e.g., adding inner padding, outer padding, etc. to various values), any number of concatenation steps (e.g., concatenating the shared key 104 with a current hash value 122 and generating a hash of the concatenated term), and any number of derivation steps (e.g., generating a derived shared key 104 related to the original shared key 104 and configured to fit in a given block size), any number of hashing steps, and/or any number of other functions useful for generating secure token 110 using shared key 104 and current hash value 122 as input.

After generating secure token 110, authenticating device 102 can digitally sign secure token 110 using private key 108 and then transmit the secure token 110 to authenticator server 112 via network 126. Authenticator server 112 can be any physical, virtual, distributed, and/or remote server capable of executing authentication protocols and procedures in a digital environment. Authenticator server 112 can store an asymmetric key pair including a public key 116 and a private key 118. Authenticator server 112 can also store the shared key 104 that is privately shared between the authenticator server 112 and the authenticating device 102. The authenticator server 112 is also shown as storing the blockchain 120, however, in other embodiments, the blockchain 120 can be hosted by a trusted third-party that is communicatively coupled to the authenticator server 112 and the authenticating device 102. Regardless, and in accordance with embodiments of the present disclosure, authenticator server 112 can record transactions 124 in blockchain 120. Transactions 124 can be a record of authentications including data such as an authentication type, an authentication time, an authentication location, an authenticated identity, a recordation of the secure token 110, a recordation of the verification token 114, and/or other information.

Blockchain 120 can be any blockchain data storage technique now known or later developed. However, embodiments of the present disclosure are not necessarily limited to blockchains. For example, a secure, encrypted database storing a random number generator configured to generate a new random number at each interval of time (e.g., 1 minute) could likewise be used, albeit without the immutable, auditable record provided by the blockchain 120.

Authenticator server 112 generates a verification token 114 based on the current hash 122 and the shared key 104 and using a same algorithm as used by the authenticating device 102 to generate secure token 110 (e.g., KDF, HMAC, etc.). Authenticator server 112 determines if the verification token 114 matches the secure token 110 generated by authenticating device 102. In the event the verification token 114 matches the secure token 110, then the authenticator server 112 authenticates the authenticating device 102. Authenticator server 112 can then store the authentication in transactions 124 of blockchain 120, thereby creating an auditable record of the authentication and modifying the current hash 122 so that the secure token 110 is rendered obsolete and cannot be reused in a replay attack.

FIG. 1 is illustrated for ease of discussion and is not to be taken in a limiting sense. Each embodiment of the present disclosure does not necessarily require each component discussed in FIG. 1. Likewise, embodiments of the present disclosure can exist that include more or fewer components than those components illustrated in FIG. 1. Furthermore, the configuration of the components in FIG. 1 is not limiting, and embodiments exist that include similar or dissimilar components arranged in similar or alternative configurations than the configuration shown.

Figure 2:
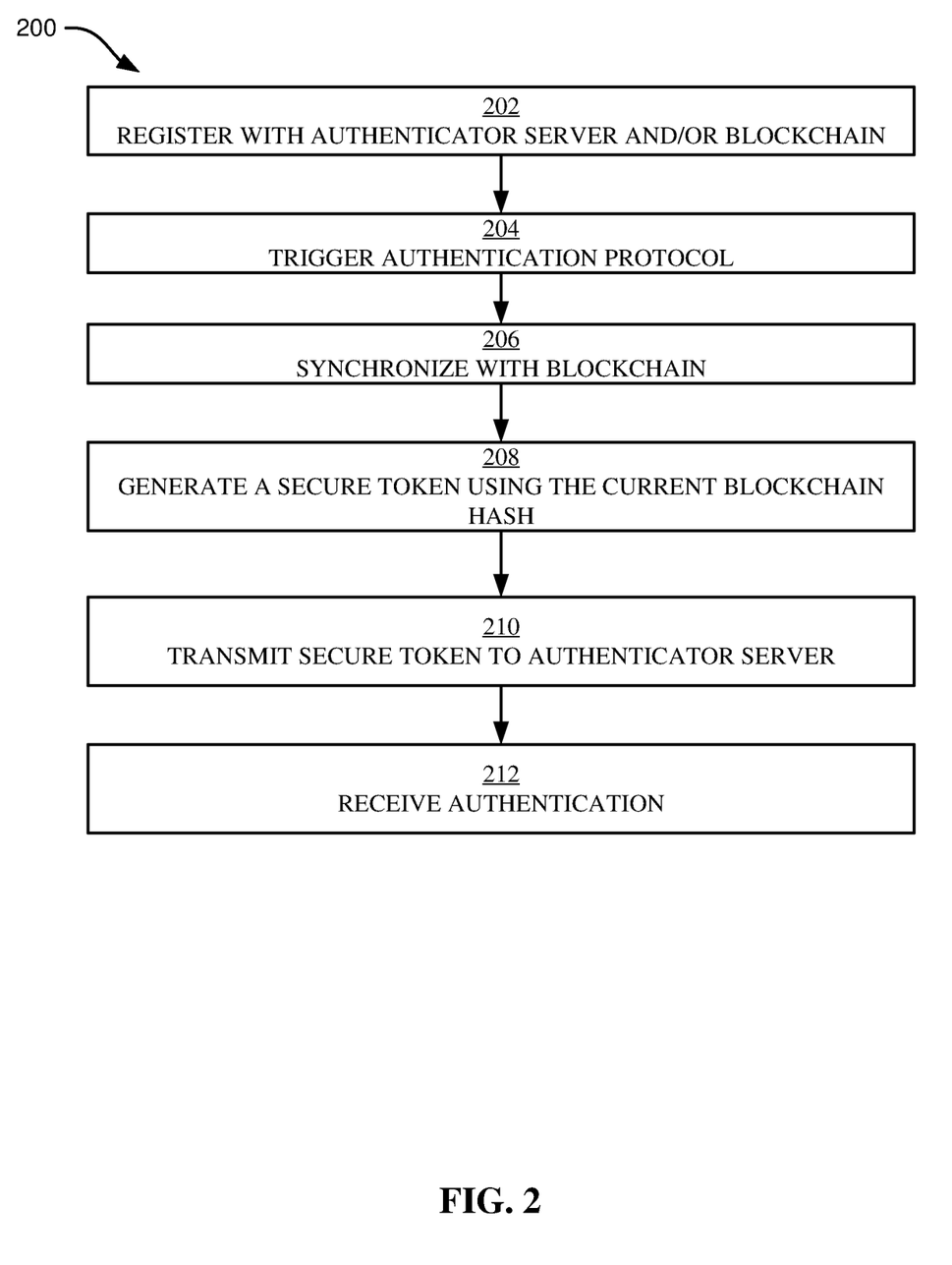
FIG. 2 illustrates a flowchart of an example method for performing authentication by an authenticating device, in accordance with embodiments of the present disclosure.

Referring now to FIG. 2, illustrated is a flowchart of an example method 200 for requesting authentication by an authenticating device 102, in accordance with embodiments of the present disclosure. Although the method 200 is discussed as being implemented by authenticating device 102, other combinations of hardware and/or software are also capable of executing the method 200.

In operation 202, the authenticating device 102 registers with an authenticator server 112 and/or a blockchain 120. Registration can include generating an asymmetric key pair (e.g., a public key 106 and a private key 108) and/or generating a shared key 104 that is known to both the authenticating device 102 and an authenticator server 112. Registration can involve storing details such as identification, public keys, signatures, etc. on the blockchain 120 (e.g., in a genesis block).

In operation 204, the authenticating device 102 can trigger an authentication protocol. An authentication protocol can be triggered in response to the authenticating device 102 attempting to open an application, attempting to access protected data, attempting to alter device parameters/settings, attempting to send a communication (e.g., email, text, voice call, etc.), attempting to physically enter a restricted area (e.g., a closed gate, a locked door, etc.), and so on. Operation 204 can be manually triggered (e.g., based on user input to an interface, a voice command, etc.) or automatic (e.g., in response to the authenticating device 102 entering predefined geolocation, etc.).

In operation 206, the authenticating device 102 synchronizes with the blockchain 120. In some embodiments, authenticating device 102 synchronizes with the blockchain 120 in response to an authentication protocol being triggered, while in other embodiments, the authenticating device 102 synchronizes with the blockchain 120 at each preselected time interval (e.g., each hour, each ten minutes, etc.). Synchronizing the authenticating device 102 with the blockchain 120 includes at least retrieving a current hash value 122 from the blockchain 120. In various embodiments, the current hash value 122 can be based on (e.g., related to, associated with, derived from, etc.) numerous factors, including, but not limited to, the transactions stored in the current block, a previous block's hash value, a nonce value, all of the transactions recorded in all of the blocks, and/or other values associated with blockchain 120.

In some embodiments, synchronizing with the blockchain 120 requires the authenticating device 102 to satisfy one or more access parameters to the blockchain 120. Access parameters can include, but are not limited to, static passwords, biometric passwords (e.g., fingerprints, eye-graphs, voice patterning, etc.), geolocation parameters, timing parameters, and/or other parameters. Satisfying access parameters to the blockchain 120 increases the security of the authentication protocol by creating a multi-factor authentication protocol.

In operation 208, the authenticating device 102 generates a secure token 110 using the shared key 104 and the current hash value 122 of the blockchain 120 as inputs, where the current hash value 122 is used as a moving factor. In some embodiments, the authenticating device 102 generates the secure token 110 by applying a KDF or HMAC function using the current hash value 122 and/or the shared key 104 as inputs. Operation 208 is discussed in more detail hereafter with respect to FIG. 4A.

In some embodiments, operation 208 further includes signing the secure token 110 using the private key 108 of the authenticating device 102. Signing the secure token 110 with the private key 108 can validate that the secure token 110 is from the authenticating device 102 (thereby improving security).

In operation 210, the authenticating device 102 transmits the secure token 110 to the authenticator server 112 via network 126.

In operation 212, the authenticating device 102 can be authenticated by the authenticator server 112. Successful authentication can result in various changes such as, but not limited to, opening an application, accessing data, completing a function (e.g., sending a message, confirming a modification, etc.), upgrading user privileges, and/or other changes that may be realized in, on, or by the authenticating device 102. In some embodiments, a successful authentication can result in various changes external to the authenticating device 102 such as, but not limited to, a gate opening, a door unlocking, a secondary device powering on, opening, or otherwise becoming functional, and so on.

The aforementioned operations can be completed in orders other than the order shown, and some operations can be completed in parallel with other operations. Additionally, embodiments exist including all, some, or none of the aforementioned operations while remaining within the spirit and scope of the present disclosure.

Figure 3:
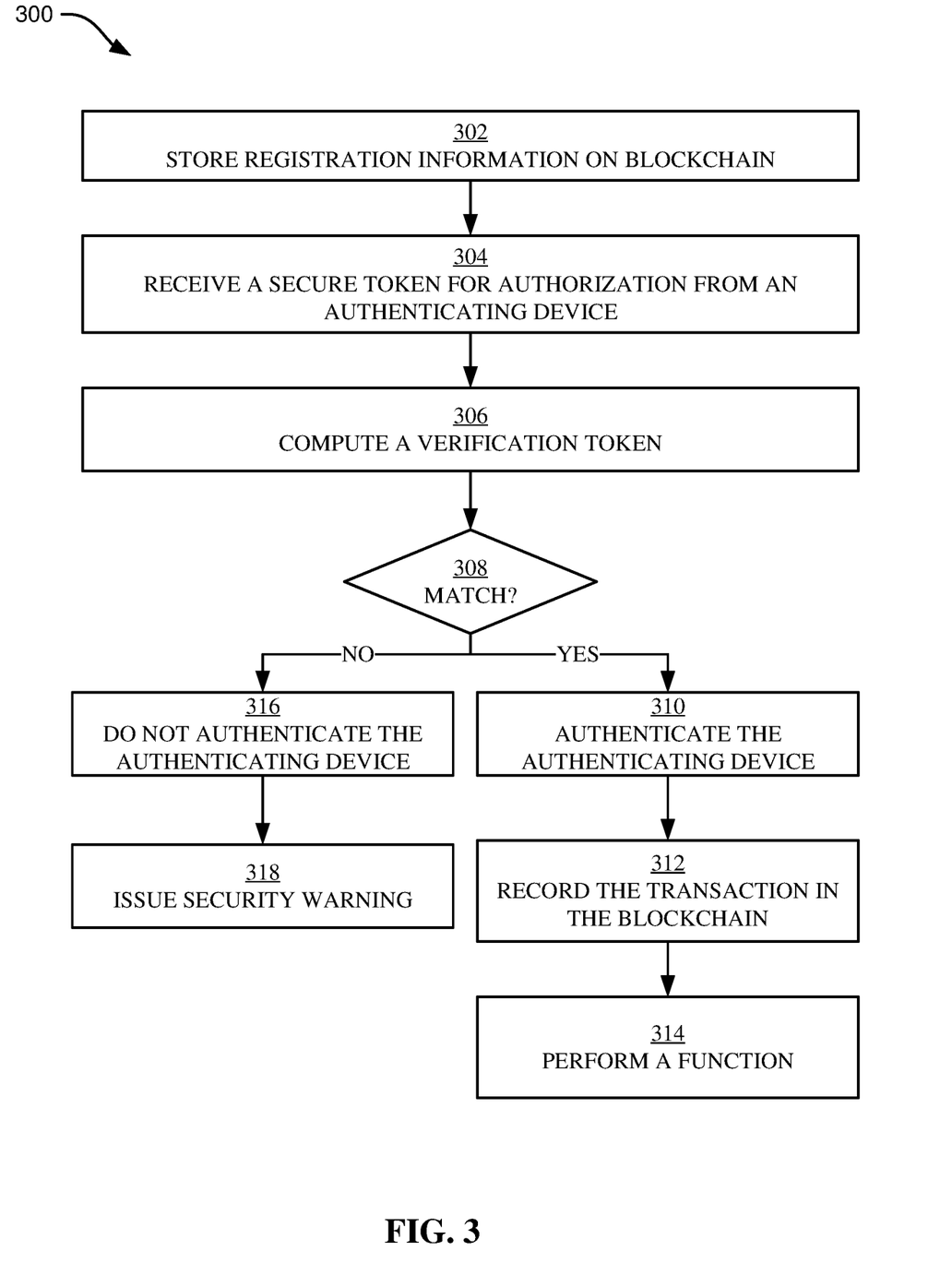
FIG. 3 illustrates a flowchart of an example method for performing authentication by an authenticator server, in accordance with embodiments of the present disclosure.

Referring now to FIG. 3, illustrated is a flowchart of an example method 300 for performing authentication at an authenticator server 112, in accordance with some embodiments of the present disclosure. Although the method 300 is described as being implemented by authenticator server 112, other combinations of hardware and/or software can likewise execute the method 300.

In operation 302, the authenticator server 112 can store registration information on a blockchain 120. Registration information can include, but is not limited to, identification information, public keys, signatures, and other information. In some embodiments, operation 302 further includes generating (e.g., creating or receiving) a shared key 104 that is privately shared between authenticator server 112 and authenticating device 102.

In operation 304, the authenticator server 112 receives a secure token 110 as part of an authentication protocol from an authenticating device 102. The secure token 110 can be received via network 126.

In operation 306, the authenticator server 112 computes a verification token 114 using the current hash value 122 of the blockchain 120 and the shared key 104 as inputs and where the current hash value 122 is used as a moving factor. Operation 306 can generate verification token 114 according to the same mechanism, algorithm, or technique used by the authenticating device 102 to generate the secure token 110. In some embodiments, authenticator server 112 also uses shared key 104 together with the current hash value 122 to generate verification token 114 (e.g., using a KDF or HMAC function). Operation 306 is discussed in more detail hereinafter with respect to FIG. 4B.

In operation 308, the authenticator server 112 determines if the secure token 110 provided by the authenticating device 102 matches the verification token 114 generated by the authenticator server 112. Determining a match can include determining the secure token 110 is identical to the verification token 114 based on each character in the sequence of characters of the secure token 110 matching each character in a corresponding position of the sequence of characters in the verification token 114.

In the event that the tokens do match (e.g., YES at operation 308), the matching tokens indicate that the authenticating device 102 and the authenticator server 112 are using the same moving factor (e.g., the same current hash value 122) and/or that the authenticating device 102 and the authenticator server 112 are using the same shared key 104. As such, the authenticating device 102 is authenticated, as in operation 310. Operation 310 can include granting access to data, programs, and/or applications executing on, or communicatively coupled to, authenticating device 102. In some embodiments, operation 310 includes issuing a notification (e.g., an indication) to the authentication device 102 indicating successful authentication.

In operation 312, the authenticator server 112 records the successful authentication in transactions 124 of the blockchain 120. Recording the transaction in the blockchain 120 can, by itself at the time of recordation, or at a later time and taken together with other recorded authentications, update the current hash value 122 of the blockchain 120 and thus render obsolete the secure token 110 originally used by the authenticating device 102 for authentication. When recording the transaction, authenticator server 112 can use its private key 118 to validate the recordation in the blockchain 120.

In operation 314, the authenticator server 112 can perform a function, or issue instructions configured to cause a different device to perform a function, in response to the successful authentication of the authenticating device 112 and based on the nature of the authentication. For example, the authenticator server 112 can issue instructions to a robotic door lock assembly to unlock in response to a successful authentication, or issue instructions to a robotic gate to open in response to a successful authentication, and so on.

Referring again to operation 308, in situations where the secure token 110 does not match the verification token 114, the lack of a match may indicate a malicious authentication attempt. As such, in operation 316, the authenticator server 112 does not authenticate the authenticating device 102. Furthermore, as shown in operation 318, the authenticator server 112 can issue a security warning to a third party and/or to a contact associated with the authenticating device 102 indicating the failed authentication attempt and notifying relevant entities of possible malicious authentication attempts.

The aforementioned operations can be completed in orders other than the order shown, and some operations can be completed in parallel with other operations. Additionally, embodiments exist including all, some, or none of the aforementioned operations while remaining within the spirit and scope of the present disclosure.

Figure 4A:
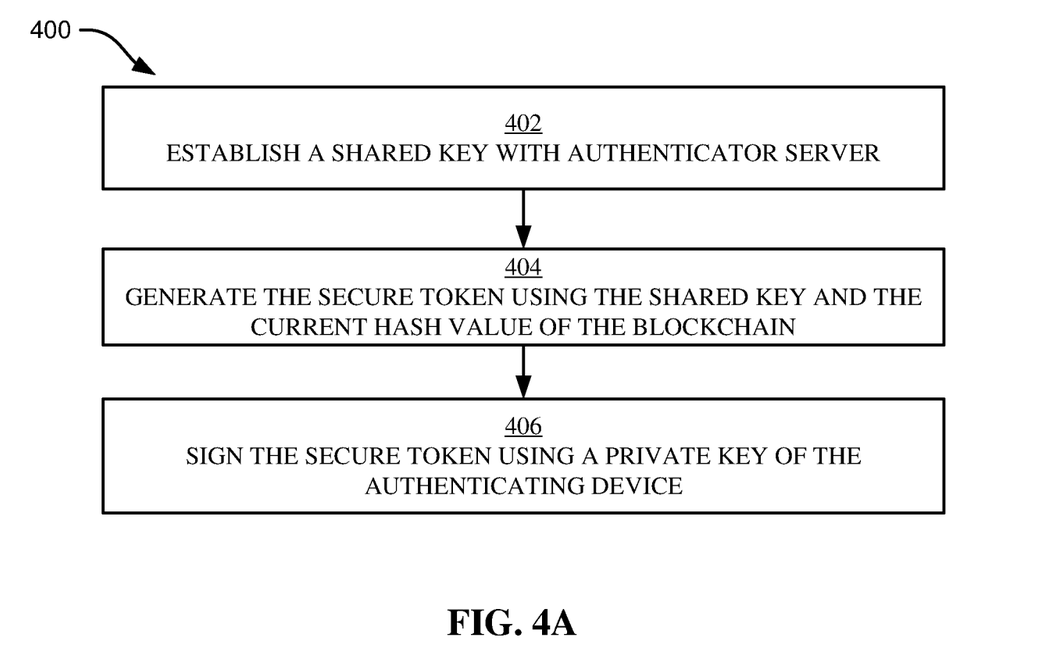
FIG. 4A illustrates a flowchart of an example method for generating a secure token by an authenticating device, in accordance with embodiments of the present disclosure.

Referring now to FIG. 4A, illustrated is a flowchart of an example method 400 for generating a secure token 110 by an authenticating device 102, in accordance with embodiments of the present disclosure. Although the method 400 is primarily discussed as implemented by an authenticating device 102 to generate a secure token 110, the operations of the method 400 can likewise be implemented by different combinations of hardware and/or software. In some embodiments, the method 400 is a sub-method of operation 208 of FIG. 2.

In operation 402, the authenticating device 102 establishes a shared key 104 with the authenticator server 112. Establishing the shared key 104 can include, as one example, generating a code, encrypting the code according to the public key 116 of the authenticator server 112, and sending the encrypted shared key 104 to the authenticator server 112 via the network 126.

In operation 404, the authenticating device 102 generates the secure token 110 using the shared key 104 and the current hash value 122 as input, where the current hash value 122 is used as a moving factor. Operation 404 can include using a KDF or a HMAC to generate the secure token 110.

In embodiments utilizing KDF, operation 404 can input the shared key 104 and the current hash value 122 into a pseudorandom function to generate secure token 110, where the pseudorandom function is selected from a pseudorandom function family (PRF) containing efficiently-computable functions selected in an manner approximating randomness.

In embodiments utilizing HMAC, operation 404 can input the shared key 104 and the current hash value 122 into a protocol configured to combine the values and generate a hash according to a hashing technique of the combined value.

In operation 406, the authenticating device 102 signs the secure token 110 using its private key 108. Signing the secure token 110 with a private key 108 can increase the security of the authentication protocol described herein by enabling validation of the secure token 110 by the authenticator server 112 using the public key 106 of the authenticating device 102.

The aforementioned operations can be completed in orders other than the order shown, and some operations can be completed in parallel with other operations. Additionally, embodiments exist including all, some, or none of the aforementioned operations while remaining within the spirit and scope of the present disclosure.

Figure 4B:
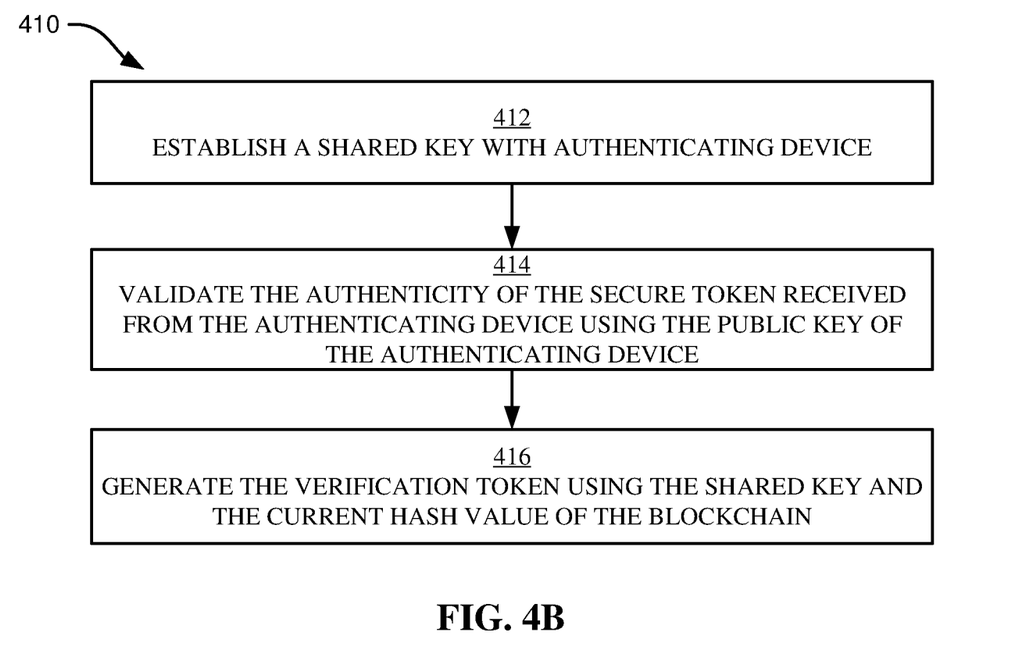
FIG. 4B illustrates a flowchart of an example method for generating a verification token by an authenticator server, in accordance with embodiments of the present disclosure.

Referring now to FIG. 4B, illustrated is a flowchart of an example method 410 for generating a verification token 114 by an authenticator server 112, in accordance with embodiments of the present disclosure. Although the method 410 is primarily discussed as implemented by authenticator server 112 to generate verification token 114, the operations of the method 410 can likewise be implemented by different combinations of hardware and/or software. In some embodiments, the method 410 is a sub-method of operation 306 of FIG. 3.

In operation 412, the authenticator server 112 establishes a shared key 104 with the authenticating device 102. Operation 412 can be consistent with operation 402 discussed above. In such embodiments, authenticator server 112 receives an encrypted shared key 104 from the authenticating device 102 and decrypts the shared key 104 using a private key 118 of the authenticator server 112.

In operation 414, the authenticator server 112 validates the authenticity of the secure token 110 received from the authenticating device 102 using the public key 106 of the authenticating device 102. In some embodiments, the public key 106 is stored in the blockchain 120, and in such embodiments, operation 414 includes retrieving public key 106 from the blockchain 120.

In operation 416, the authenticator server 112 generates verification token 114 using the shared key 104 and the current hash value 122 as inputs into a KDF or HMAC function, where the current hash value 122 is used as a moving factor. Operation 416 can be consistent with operation 404 insofar as the same techniques used to generate secure token 110 are likewise used to generate verification token 114.

The aforementioned operations can be completed in orders other than the order shown, and some operations can be completed in parallel with other operations. Additionally, embodiments exist including all, some, or none of the aforementioned operations while remaining within the spirit and scope of the present disclosure.

Figure 5:
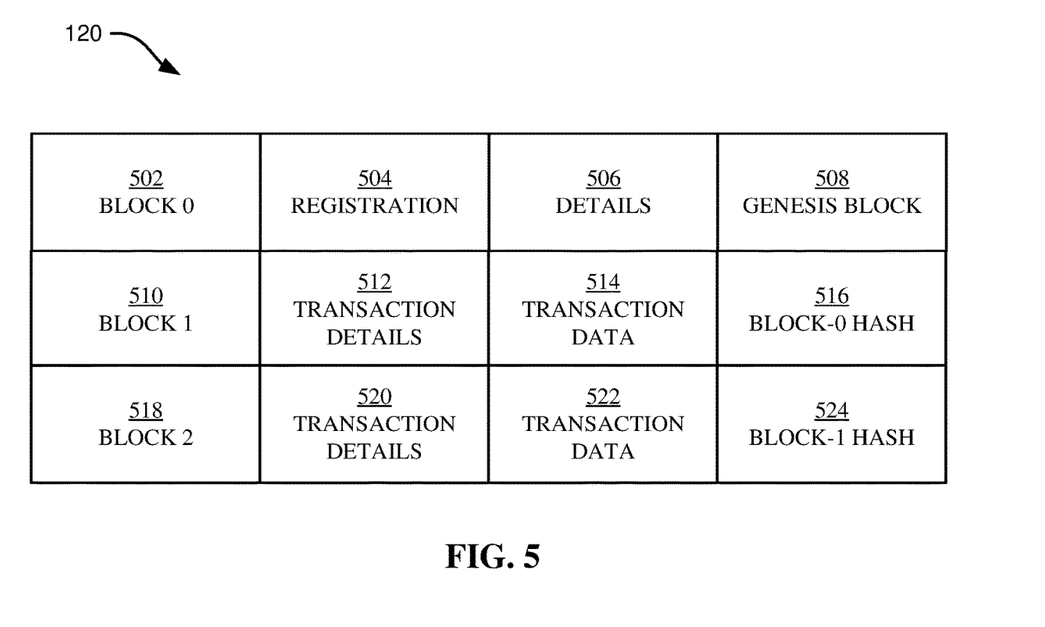
FIG. 5 illustrates a block diagram of an example blockchain data structure, in accordance with embodiments of the present disclosure.

Referring now to FIG. 5, illustrated is diagram of an example blockchain 120, in accordance with embodiments of the present disclosure. Block 0 502 stores registration information 504, details 506, and genesis block 508. As can be seen, the initial block 0 502 and its components 504, 506, and 508 are used to store registration information consistent with operation 202 of FIG. 2 and/or operation 302 of FIG. 3. Registration information 504 and details 506 can include device identifiers, user identifiers, public keys, digital signatures, and/or other information relevant to an authentication protocol.

Block 1 510 includes transaction details 512, transaction data 514, and the block-0 hash 516. Likewise, block 2 518 stores additional transaction details 520, transaction data 522, and the block-1 hash 524. Transaction details 512, 520 and transaction data 514, 522 can be consistent with transactions 124 of FIG. 1.

Transaction details 512, 520 can refer to, but are not limited to, specific details of an authentication between parties. Specific details can include program code that was executed as a result of receiving information, a verification token 114 that was generated, a digital signature that was validated, and so on.

Transaction data 514, 522 can include metadata such as an authentication type, a time of authentication, a geolocation of an authenticating device 102 at the time of authentication, an authenticator identity (e.g., user identity of a profile associated with authenticating device 102), a most recent time of synchronization with the blockchain 120, and/or other data.

As can be seen, each block in the blockchain 120 contains a hash value of a previous block in the blockchain 120. Thus, a hash of block 2 518 includes the contents of block 1 510 and block 0 502 insofar as block 2 518 contains block-1 hash 524 from block 1 510, and block 1 510 itself includes block-0 hash 516 from block 0 502. By linking blocks in the blockchain 120 in such a way, blockchain 120 creates an immutable, auditable record of authentications.

In various embodiments, the current hash value 122 (e.g., the value used as a moving factor) is the current hash value accounting for (e.g., derived from) all blocks in blockchain 120, or any portion thereof. For example, current hash value 122 can be the hash of block 2 518 including its transaction details 520 and transaction data 522 and block-1 hash 524. However, alternative hash values can also be used as the current hash value 122, such as block-1 hash 524 (e.g., the previous block's hash value recorded in the currently pending block). Regardless, the current hash value 122 is derived from blockchain 120 and subject to change as a result of changes in transactions 124.

FIG. 5 is illustrated for ease of discussion and is not to be taken in a limiting sense. Each embodiment of the present disclosure does not necessarily require each component discussed in FIG. 5. Likewise, embodiments of the present disclosure can exist that include more or fewer components than those components illustrated in FIG. 5. Furthermore, the configuration of the components in FIG. 5 is not limiting, and embodiments exist that include similar or dissimilar components arranged in similar or alternative configurations than the configuration shown.

Figure 6:
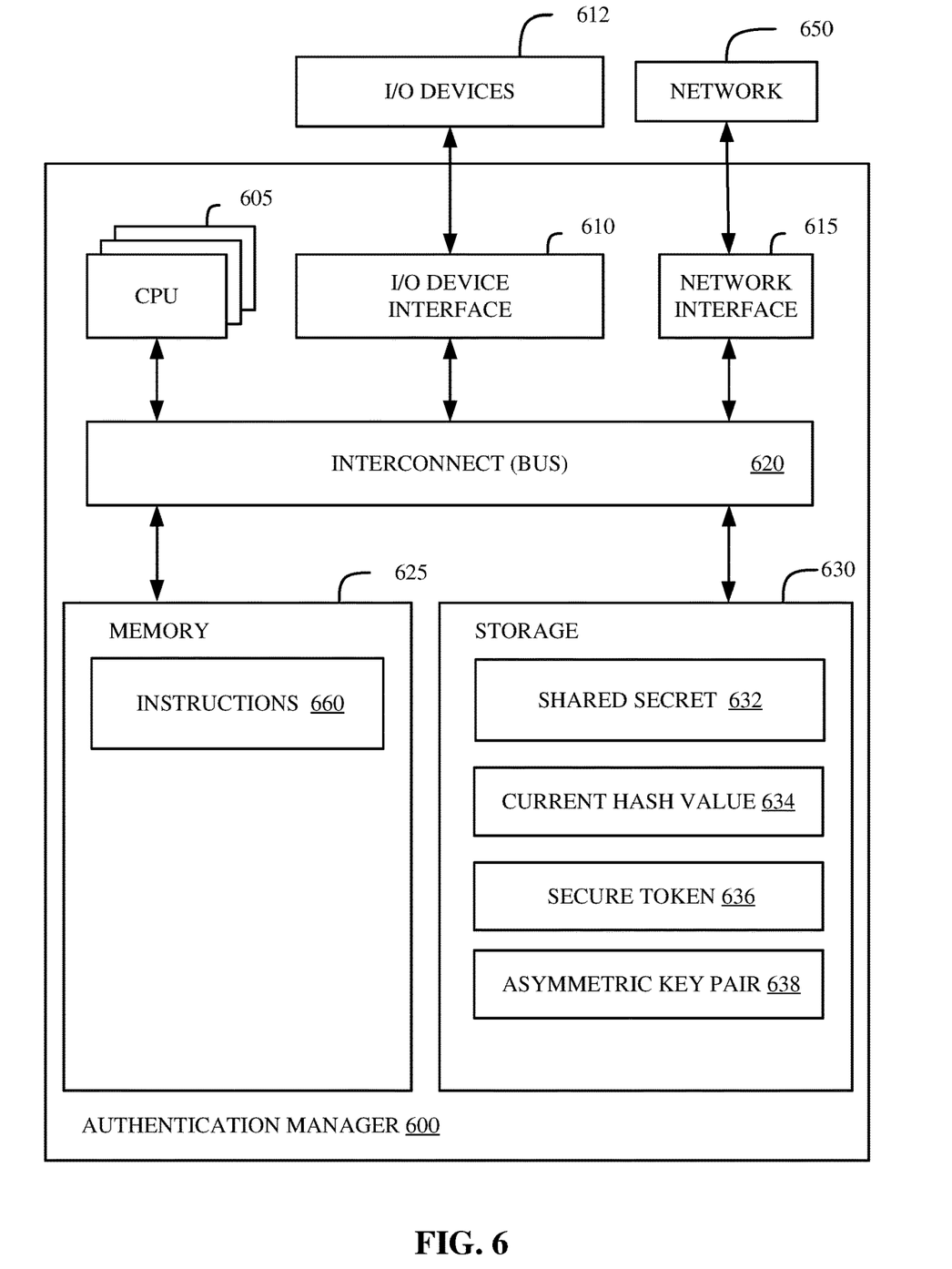
FIG. 6 illustrates a block diagram of an example authentication manager, in accordance with embodiments of the present disclosure.

FIG. 6 illustrates a block diagram of an example authentication manager 600 in accordance with some embodiments of the present disclosure. In various embodiments, authentication manager 600 can perform the methods described in FIGS. 2-4. In some embodiments, authentication manager 600 provides instructions for the aforementioned methods to a client machine such that the client machine executes the method, or a portion of the method, based on the instructions provided by the authentication manager 600. In some embodiments, authentication manager 600 comprises software executing on hardware incorporated into the authenticating device 102 and/or the authenticator server 112.

The authentication manager 600 includes a memory 625, storage 630, an interconnect (e.g., BUS) 620, one or more CPUs 605 (also referred to as processors 605 herein), an I/O device interface 610, I/O devices 612, and a network interface 615.

Each CPU 605 retrieves and executes programming instructions stored in the memory 625 or storage 630. The interconnect 620 is used to move data, such as programming instructions, between the CPUs 605, I/O device interface 610, storage 630, network interface 615, and memory 625. The interconnect 620 can be implemented using one or more busses. The CPUs 605 can be a single CPU, multiple CPUs, or a single CPU having multiple processing cores in various embodiments. In some embodiments, a CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random access memory (e.g., static random access memory (SRAM), dynamic random access memory (DRAM), or Flash). The storage 630 is generally included to be representative of a non-volatile memory, such as a hard disk drive, solid state device (SSD), removable memory cards, optical storage, or flash memory devices. In an alternative embodiment, the storage 630 can be replaced by storage area-network (SAN) devices, the cloud, or other devices connected to the authentication manager 600 via the I/O device interface 610 or a network 650 via the network interface 615.

In some embodiments, the memory 625 stores instructions 660 and the storage 630 stores a shared secret 632, a current hash value 634, a secure token 636, and an asymmetric key pair 638. However, in various embodiments, the instructions 660, shared secret 632, current hash value 634, secure token 636, and/or asymmetric key pair 638 are stored partially in memory 625 and partially in storage 630, or they are stored entirely in memory 625 or entirely in storage 630, or they are accessed over a network 650 via the network interface 615.

Instructions 660 can be processor-executable instructions for performing any portion of, or all of, any of the methods of FIGS. 2-4 and/or any of the functionality discussed in FIGS. 1 1 and 5.

Shared secret 632 (e.g., shared key 104 of FIG. 1) can be a secret value privately shared by authenticating device 102 and authenticator server 112. Current hash value 634 can be consistent with current hash value 122. Secure token 636 can be consistent with secure token 110 or verification token 114. Asymmetric key pair 638 can include a private key (e.g., 108, 118) and a public key (e.g., 106, 116). Shared secret 632 can be used together with current hash value 634 to generate secure token 636 that can be signed by a private key of an asymmetric key pair 638 and verified using a public key of the asymmetric key pair 638.

In various embodiments, the I/O devices 612 include an interface capable of presenting information and receiving input. For example, I/O devices 612 can present information to a user interacting with authentication manager 600 and receive input from the user.

Authentication manager 600 is connected to the network 650 via the network interface 615. Network 650 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
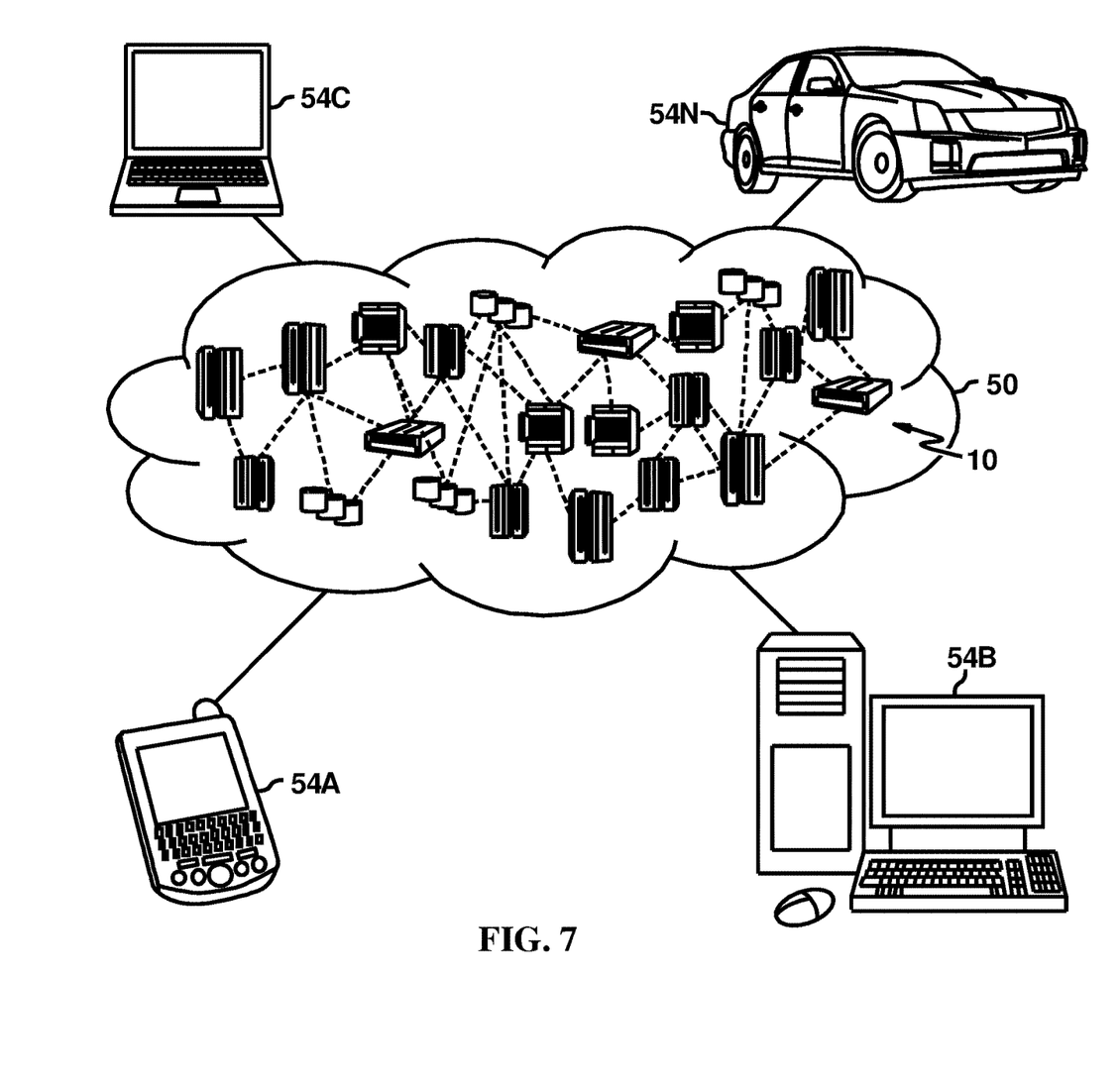
FIG. 7 depicts a cloud computing environment, according to some embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
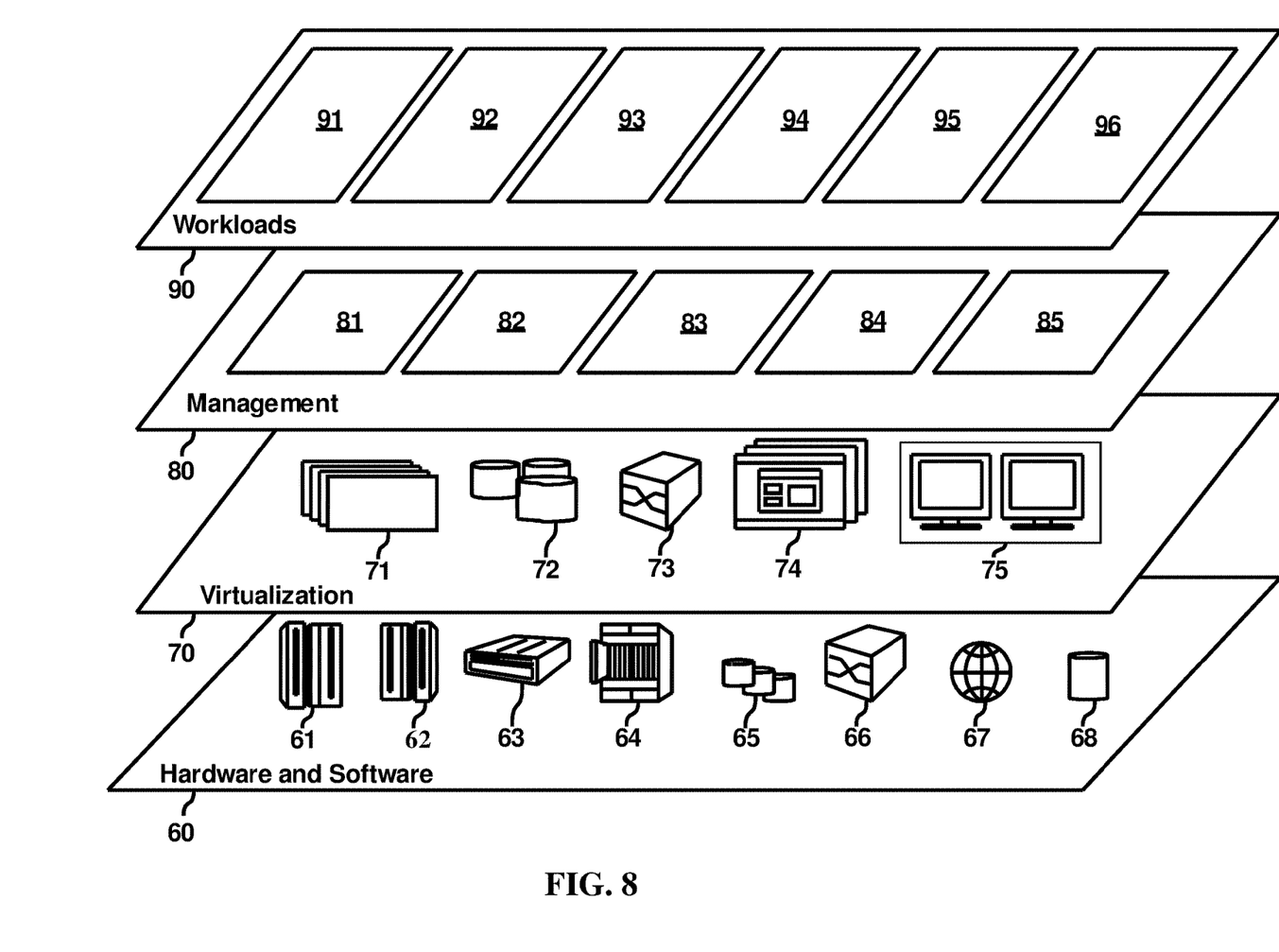
FIG. 8 depicts abstraction model layers, according to some embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and authentication management 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 660 of FIG. 6 and/or any software configured to perform any subset of the methods described with respect to FIGS. 2-4 and/or any of the functionality discussed in FIGS. 1 and 5) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
   retrieving, by an authenticating device and from a blockchain, a current blockchain hash value of the blockchain, wherein the authenticating device and an authenticator server each have access to the blockchain, and wherein the authenticating device and the authenticator server share a secret key value;
   generating, by the authenticating device, a secure token using a key derivation function (KDF) having the secret key value and the current blockchain hash value as inputs, wherein the current blockchain hash value is used as a moving factor;
   transmitting the secure token to the authenticator server; and
   receiving an indication of authentication from the authenticator server, wherein the authentication causes the secure token to be obsoleted by changing the current blockchain hash value of the blockchain.

2. The method of claim 1, wherein retrieving the current blockchain hash value further comprises:
   satisfying an access parameter of the blockchain; and
   synchronizing the blockchain to the authenticating device.

3. The method of claim 2, wherein the access parameter comprises an alphanumeric password.

4. The method of claim 2, wherein the access parameter comprises a geolocation.

5. The method of claim 2, wherein the access parameter comprises a time parameter.

6. The method of claim 2, wherein the access parameter comprises a biometric parameter.

7. The method of claim 1, wherein generating the secure token further comprises signing the secure token with a private key of the authenticating device, and wherein a public key of the authenticating device is stored in the blockchain.

8. The method of claim 7, wherein prior to retrieving the current blockchain hash value, the method further comprises:
   registering the authenticating device with the blockchain by storing the public key of the authenticating device in a first block of the blockchain.

9. The method of claim 1, wherein receiving the indication of authentication from the authenticator server further comprises:
   receiving access privileges to an application executing on the authenticating device.

10. A computer-implemented method comprising:
    receiving, by an authenticator server and from an authenticating device, a secure token, wherein the authenticating device and the authenticator server share a secret key value, and wherein the authenticating device and the authenticator server each have access to a blockchain;
    generating, by the authenticator server, a verification token using a key derivation function (KDF) having the secret key value and a current blockchain hash value of the blockchain as inputs, wherein the current blockchain hash value is used as a moving factor;
    determining, by the authenticator server, that the verification token matches the secure token received from the authenticating device; and
    authenticating the authenticating device in response to determining that the verification token matches the secure token, wherein the authenticating causes the secure token to be obsoleted by changing the current blockchain hash value of the blockchain.

11. The method of claim 10, wherein determining that the verification token matches the secure token further comprises:
validating a digital signature appended to the secure token using a public key of the authenticating device, wherein the public key of the authenticating device is retrieved from the blockchain.

12. The method of claim 10, further comprising:
recording the authenticating of the authenticating device in the blockchain using a private key associated with the authenticator server.

13. A system comprising:
an authenticating device comprising a processor and a computer-readable storage medium communicatively coupled to the processor and storing program instructions which, when executed by the processor, cause the authenticating device to perform a method comprising:
retrieving, from a blockchain, a current blockchain hash value of the blockchain, wherein the authenticating device and an authenticator server each have access to the blockchain, and wherein the authenticating device and the authenticator server share a secret key value;
generating a secure token using a key derivation function (KDF) having the secret key value and the current blockchain hash value as inputs, wherein the current blockchain hash value is used as a moving factor;
transmitting the secure token to the authenticator server; and
receiving an indication of authentication from the authenticator server, wherein the authentication causes the secure token to be obsoleted by changing the current blockchain hash value of the blockchain.

14. The system of claim 13, wherein the program instructions were downloaded over a network from a remote server.

15. The system of claim 13, wherein retrieving the current blockchain hash value further comprises:
satisfying an access parameter of the blockchain; and
synchronizing the blockchain to the authenticating device.

16. The system of claim 15, wherein the access parameter is selected from a group consisting of: an alphanumeric password, a geolocation, a time parameter, and a biometric parameter.

17. The system of claim 13, wherein generating the secure token further comprises signing the secure token with a private key of the authenticating device, and wherein a public key of the authenticating device is stored in the blockchain.

18. The system of claim 17, wherein prior to retrieving the current blockchain hash value, the method further comprises:
registering the authenticating device with the blockchain by storing the public key of the authenticating device in a first block of the blockchain.

19. The system of claim 13, wherein receiving the indication of authentication from the authenticator server further comprises:
receiving access privileges to an application executing on the authenticating device.

\* \* \* \* \*